Feb. 8, 1944.   I. L. BALDWIN   2,341,259
INOCULATING METHOD AND APPARATUS
Filed Jan. 22, 1941

INVENTOR
Ira L. Baldwin
BY Nathaniel Ely
ATTORNEY

Patented Feb. 8, 1944

2,341,259

UNITED STATES PATENT OFFICE 2,341,259

INOCULATING METHOD AND APPARATUS

Ira L. Baldwin, Madison, Wis., assignor to The Lummus Company, New York, N. Y., a corporation of Delaware Application January 22, 1941, Serial No. 375,392

10 Claims. (Cl. 195—120)

This invention relates to improvements in the method of and apparatus for inoculating a fermentable mash with a bacterial culture or the like to induce fermentation.

It has been my experience that the fermentation of molasses and like mashes for the production of solvents especially by butyl organisms of the anaerobic type has often been objectionably irregular in the yield of solvents. Despite the elaborate precautions taken to insure the sterility of the fermentation vessel and the mash before and during the fermentation reaction, the results indicate that contamination of the vessel and its contents does occur.

A careful analysis of the fermentation procedure has led me to the conclusion that the manner of introducing the appropriate bacterial culture or inoculum into the mash for fermentation thereof is a primary source of infection or contamination. The procedure customarily followed is to merely pour the prepared inoculum into the vessel containing the unfermented mash. As a result, the inoculum is agitated, and a greter surface is exposed to the air; in addition, unsterile air is drawn into the fermenting vessel along with the inoculum. It is not only the air thus entrained by the inoculum which inhibits the fermenting capacity of these anaerobic bacteria; it is also the foreign bacteria and other organisms thus introduced which inhibit the growth and activities of the butyl bacteria.

It is one of the principal objects of my invention to provide a simplified inoculating method and apparatus especially suitable for anaerobic bacteria whereby the inoculum can be transferred to a fermentable mash without a substantial contact or exposure thereof to unsterile air.

It is another object of my invention to provide a simplified apparatus for the regulation of the introduction of an inoculum into a fermentable mash under pressure, which apparatus can be readily sterilized and maintained in an aseptic condition.

Further objects and advantages of my invention will appear from the following disclosure of a preferred form of embodiment thereof taken in connection with the attached drawing illustrative thereof, of which:

Figure 1:
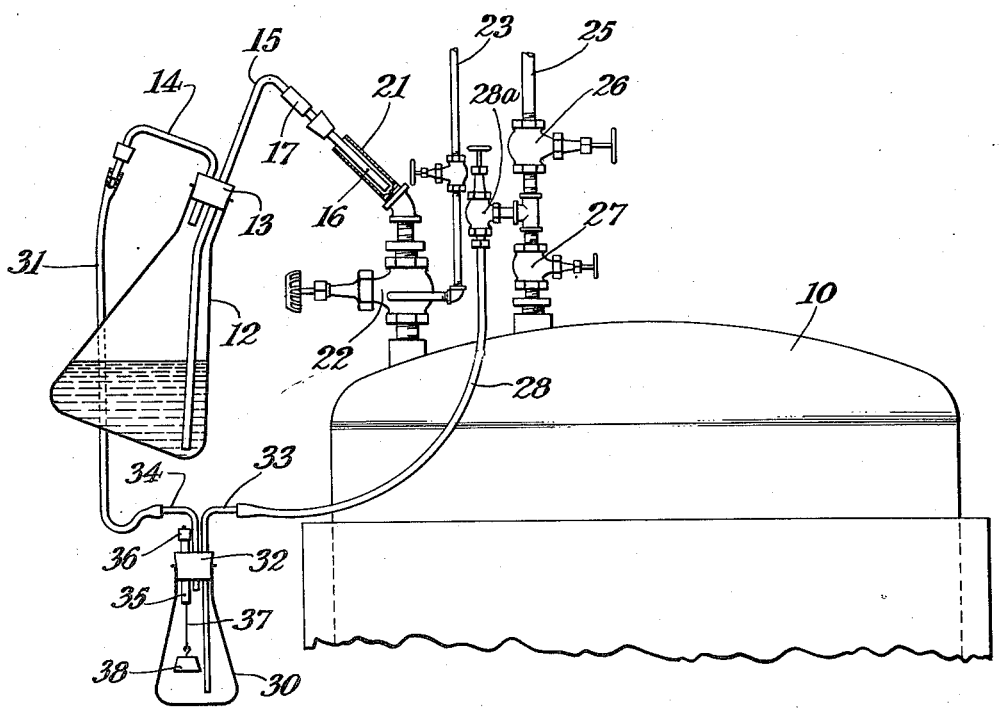
Fig. 1 is a diagrammatic view of a portion of a bub tank and my improved inoculating apparatus.
Figure 3:
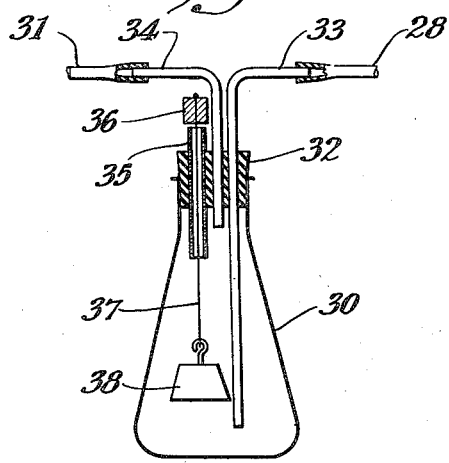
Fig. 3 is an enlarged detail view of the pressure-regulating flask.
Figure 2:
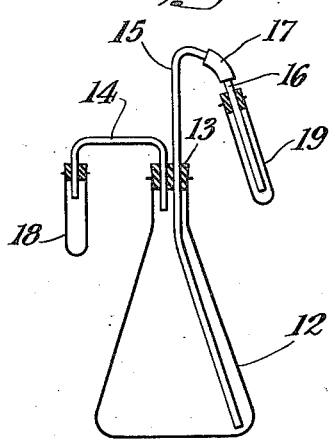
Fig. 2 is a detailed elevational view with parts in section of the inoculum-containing flask.

In accordance with the preferred form of embodiment of my invention, I provide means and a method for inoculating a fermentable mash contained in a tank such as the bub tank 10 with a culture of bacteria. In the particular application of my invention, the bacterial culture comprises a butyl organism by means of which I am able to obtain from a suitable fermentable mash industrial solvents which include butyl alcohol and acetone among others. Although my invention is of particular advantage in connection with inoculation with anaerobic bacteria, it has desirable applications in connection with the introduction of any type of bacteria into a fermentable mash.

The butyl organism is preferably developed, usually in a liquid medium, in a flask or the like generally indicated at 12. The flask is usually of glass so that the growth of the culture can be watched and also so that the removal of its contents can be more carefully controlled. I have found that an Erlenmeyer flask is most suitable for this purpose.

During the development of the butyl culture therein, flask 12 may be conveniently stoppered as with a wad of cotton to permit the gaseous products formed to be driven off. After the culture has been sufficiently developed to permit of transfer to the fermenting vessel, a suitable stopper 13, through which project an inlet tube 14 for a gas under pressure and an outlet tube 15 for the removal of the culture, is inserted under aseptic conditions into the opening of flask 12 in place of the wad of cotton. The outlet tube, for purposes to be hereinafter described, extends substantially to the bottom of the flask and preferably to one edge thereof. Outlet tube 15 is conveniently connected to a culture injection tube 16 as by the flexible member 17. During the brief period before the inoculum is introduced into the fermentable mash, the inlet tube 14 and the injection tube 16 are normally covered with sealed aseptic test tubes 18 and 19 or the like to prevent infection thereof by foreign organisms which might contaminate the inoculum during the transfer thereof.

The bub tank 10 is provided with a receiving nozzle 21 into which the injection tube 16 is inserted for transfer of the inoculum. Tube 16 should fit into nozzle 21 as tightly as possible for rapid manipulation; if necessary, loose packing (not shown) may be utilized to secure an air-tight fit. Receiving nozzle 21 is interconnected with the vessel 10 through the valve 22, which preferably is of the globe type and is provided with a steam connection 23, by means of which a small amount of steam may be passed through the valve bonnet at all times except during inoculation when valve 22 is opened. The steam connection is made above the valve seat so that the steam can escape through the receiving nozzle 21 to maintain it entirely aseptic between successive inoculations.

Bub tank 10 is also provided with an air connection 25 having suitable valves 26 and 27 for the introduction of air to remove the contents therefrom. Sterile air is preferably used to prevent possible contamination from this source. For the purpose of inoculation, a flexible line 28 and valve connection 28a are provided to conduct sterile air to the culture flask 12. This is preferably accomplished by first passing the air through a pressure-regulating or control flask 30 and thence by the flexible line 31 to the inlet tube 14 of the culture flask 12.

The pressure control flask 30 is usually smaller than the culture flask and may be provided with a suitable stopper 32, through which passes a plurality of tubes 33 and 34, which are respectively interconnected with the flexible air-feed line 28 and the flexible air-discharge line 31. In addition a tube 35 is provided, through which a pressure release valve is inserted. This valve includes a suitable sealing member such as a cork 36 interconnected by a fine wire 37 to a suitable weight 38. It will be apparent that, if the air pressure within the flask 30 becomes excessive, the cork 36 will rise and permit an escape of the air whereby the development of an excessive pressure within the inoculating system is prevented.

The operation of the apparatus includes the introduction of sterile air through the line 28 into the pressure control flask 30 and thence into the culture flask 12. As the air is introduced into flask 12, it will exert a continuous pressure against the upper surface of the liquid inoculum and will tend to force the liquid out through the tube 15 and into the bub tank 10 through the nozzle 21. For this reason tube 15 preferably extends to the bottom of the flask and to one edge thereof.

It has been my observation that the introduction of the culture can thus be made substantially continuous and that the disturbance of the inoculum by the compressed air is reduced to a minimum. The only surface which is in contact with the air is the upper surface of the body of inoculum in the flask 12, and the air acts as a piston, forcing this inoculum out of the flask. There is no substantial inhibition of the fermenting power of the anaerobic bacteria when this operation is carried out. In any case the inoculum should always be withdrawn from the culture flask at a point below the surface of the liquid therein.

If desired, it is possible to insert a filter (not shown) in the air line as by inserting a suitable filtering material preferably at some point in the flexible line 28 or in the intermediate line 31. Ordinarily, the use of a filter is not necessary since the air in line 25 is already preferably sterile and filtered.

It may also be found desirable in some cases to use a sterile inert gas for discharging the inoculum from flask 12, and a separate supply of such gas such as nitrogen can be readily connected to the inlet tube 33. The use of air in the manner described, however, is usually most satisfactory and is least expensive.

If it is desired to stop the flow of inoculum, it is possible to manually raise the cork 36 from its seat to permit the desired escape of air whereby the pressure within the system will be so reduced that the flow will immediately stop.

It will be seen that I have provided a simple but effective method and apparatus for the transfer of an inoculum to a fermentable mash with the least chance for contamination or infection of the mash by foreign organisms or for contact of the inoculum with air.

While I have shown and described a preferred form of embodiment of my infention, I am aware that modifications may be made thereto; and I, therefore, desire a broad interpretation of my invention within the scope and spirit of the description herein and of the claims appended hereinafter.

I claim:

1. The method of inoculating a fermentable mash with an inoculum of anaerobic bacteria grown in a liquid medium, which comprises the steps of maintaining a body of the inoculum in a confined zone, introducing sterile air under pressure into contact with the upper surface only of said body of inoculum, controlling the pressure of the sterile air upon said surface to prevent agitation of the inoculum, removing the inoculum from said confined zone by differential of pressure from a point always beneath the upper surface of said body of inoculum, and introducing said inoculum into said fermentable mash without substantial aeration.

2. The method of inoculating a fermentable mash with an inoculum of anaerobic bacteria grown in a liquid medium, which comprises the steps of maintaining a body of the inoculum in a confined zone, introducing sterile air under pressure into contact with the upper surface only of said body of inoculum, controlling the pressure of the sterile air upon said surface to prevent agitation of the inoculum, removing the inoculum from said confined zone by differential of pressure only from a point near the bottom thereof, and introducing said inoculum into said fermentable mash without substantial aeration.

3. The method of inoculating a fermentable mash with a culture of anaerobic bacteria, which comprises developing the bacterial culture in a liquid medium maintained in a confined zone, applying sterile air to the upper surface only of the resulting liquid body of culture under a pressure in excess of that under which the fermentable mash is maintained, controlling the pressure of the sterile air upon said surface to prevent agitation of the inoculum, removing said culture from a point near the bottom of said confined zone whereby the culture undergoes a minimum of agitation, and introducing said culture into said fermentable mash.

4. The method of inoculating a fermentable mash with an inoculum of anaerobic bacteria grown in a liquid medium, which comprises the steps of maintaining a body of the inoculum in a confined zone, introducing a sterile gas inert with respect to the inoculum under pressure into contact with the upper surface only of said body of inoculum, controlling the pressure of said gas upon said surface to prevent agitation of the inoculum, removing the inoculum from said confined zone by differential of pressure from a point always beneath the upper surface of said body of inoculum, and introducing said inoculum into said fermentable mash without substantial aeration.

5. An inoculating device for carrying and transferring anaerobic bacteria into a fermenter, which comprises a receptacle, means to introduce inert gas under pressure into the upper part of said receptacle, means to control the pressure of said gas within the receptacle, and a discharge conduit interconnected with the receptacle and in receiving communication with the bottom portion only of the space within the receptacle whereby liquid discharged therefrom is subjected to the minimum surface of gas contact.

6. An inoculating device for carrying and transferring anaerobic bacteria into a fermenter, which comprises a receptacle having a base and a restricted opening therein opposite said base, means to seal said opening, tubular members extending through said sealing means, one of said tubular members extending into said receptacle to a point near the edge of the base, the other tubular member extending only partially into said receptacle, means to introduce a gaseous medium to the shorter tubular member, and means to control the pressure of said gaseous medium within the receptacle, the other of said tubular members being adapted to conduct a material from near the base of the receptacle away from said second mentioned tubular member.

7. In a fermenting apparatus including a fermenting vessel, an inoculating device comprising a gas-tight flask to contain a liquid inoculum, a gas-tight inoculum discharge conduit leading from the interior of said flask, at a point approximately at the bottom of the latter, to said vessel and in gas-tight connection with both the flask and the vessel, a gas supply connection in gas-tight delivery connection with said flask and opening into the flask at a point spaced above the liquid level therein for continuous delivery of a gas under pressure to the flask to force the inoculum from the flack continuously through said discharge conduit to the fermenting vessel by pressure of said gas upon the upper surface only of the liquid inoculum in the flask, and pressure-regulating means responsive to a predetermined pressure of said gas to limit the pressure thereof upon said liquid surface and thereby prevent agitation of the liquid by the gas and discharge of the gas with the liquid.

8. In a fermenting apparatus including a fermenting vessel, a conduit to deliver a sterile gas to said vessel and a valve operable to control admission of said gas from said conduit to the vessel, an inoculating device comprising a flask to contain a liquid inoculum, a gas-tight liquid discharge conduit leading from the interior of said flask, at a point approximately at the bottom of the latter, to said vessel and in gas-tight connection with the flask and the vessel, means forming a pressure control chamber, a gas-tight branch conduit leading from said gas-delivery conduit, at a point beyond said valve, to said pressure control chamber and in gas-tight delivery connection with the latter, a valve operable to control flow of gas through said branch conduit to said pressure control chamber, a gas-tight delivery connection between said chamber and flask and opening into the latter at a point spaced above the level of the liquid therein for delivery of said gas under pressure to the flask for continuously forcing the inoculum therefrom through said inoculum discharge conduit to the fermenting vessel by pressure of said gas upon the upper surface only of the liquid in the flask, and a pressure-regulating valve responsive to a predetermined pressure of said gas in said control chamber to limit said pressure and thereby limit the gas pressure in the flask, to prevent agitation of the liquid in the flask and discharge of the gas with the liquid.

9. The method of inoculating a fermentable mash with an inoculum of anaerobic bacteria grown in a liquid medium which comprises the steps of maintaining a body of the inoculum in a confined zone, introducing a gas under pressure into contact with the upper surface only of said body of inoculum, discharging the inoculum from said confined zone by pressure of said gas upon said surface of the body of inoculum, conducting the so-discharged inoculum to the fermentable mash, limiting the pressure of said gas upon said surface of the inoculum to prevent agitation of the latter and discharge of the gas therewith, and excluding external atmosphere from the inoculum, from said gas and from the fermentable mash throughout the performance of said steps.

10. The method of inoculating a fermentable mash in a fermenting vessel with an inoculum of anaerobic bacteria grown in a liquid medium, which comprises the steps of maintaining a body of the inoculum in a confined zone, delivering a sterile gas under pressure from a supply source to said vessel prior to introduction of the mash to the vessel, diverting delivery of said sterile gas from said vessel and introducing the diverted gas into contact with the upper surface only of said body of inoculum, discharging the inoculum from said confined zone by pressure of said gas upon the upper surface only of the body of inoculum, conducting the so-discharged inoculum to the fermenting vessel for introduction to the mash, limiting the pressure of said gas upon the surface of the inoculum to prevent agitation of the latter and discharge of the gas with the inoculum, and excluding external atmosphere from the sterile gas and from the inoculum throughout the introduction of said gas to the inoculum, the discharge of the inoculum from said zone and the conduction of the inoculum to the fermenting vessel.

IRA L. BALDWIN.